US011653367B2

United States Patent
Cudak et al.

(10) Patent No.: US 11,653,367 B2
(45) Date of Patent: May 16, 2023

(54) INTEGRATED ACCESS-BACKHAUL OPERATION

(71) Applicant: Nokia Technologies Oy, Espoo (FI)

(72) Inventors: Mark Cudak, Rolling Meadows, IL (US); Kevin Wanuga, Souderton, PA (US); Juha Sakari Korhonen, Espoo (FI); Ilkka Keskitalo, Oulu (FI); Keeth Saliya Jayasinghe Laddu, Piliyandala (LK); Axel Mueller, Paris (FR)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/986,663

(22) Filed: Aug. 6, 2020

(65) Prior Publication Data
US 2022/0046638 A1 Feb. 10, 2022

(51) Int. Cl.
*H04W 72/04* (2009.01)
*H04W 28/26* (2009.01)
(Continued)

(52) U.S. Cl.
CPC .... *H04W 72/0433* (2013.01); *H04B 7/15542* (2013.01); *H04W 28/26* (2013.01); *H04W 84/047* (2013.01); *H04W 88/085* (2013.01)

(58) Field of Classification Search
CPC ............. H04W 72/0433; H04W 28/26; H04W 88/085; H04W 84/047; H04W 92/20; H04W 72/042; H04B 7/15542
See application file for complete search history.

(56) References Cited

U.S. PATENT DOCUMENTS

| 2020/0007194 | A1* | 1/2020 | John Wilson | H04W 76/15 |
| 2021/0144719 | A1* | 5/2021 | Choi | H04L 27/2602 |
| 2021/0282114 | A1* | 9/2021 | Liu | H04W 72/046 |

FOREIGN PATENT DOCUMENTS

| EP | 3 651 526 A1 | 5/2020 |
| WO | WO-2020/092912 A1 | 5/2020 |
| WO | WO-2020/112811 A1 | 6/2020 |

OTHER PUBLICATIONS

"New WID on Enhancements to Integrated Access and Backhaul", Qualcomm, 3GPP TSG RAN Meeting #86, RP-19351, Dec. 2019, 5 pages.

(Continued)

*Primary Examiner* — Nam T Huynh
(74) *Attorney, Agent, or Firm* — Harrington & Smith

(57) ABSTRACT

In accordance with example embodiments of the invention there is at least a method and apparatus to perform determining, by a first network device in a communication network, allocation information for an availability of resources in the communication network; and sending, by the network device, to a second network device the allocation information for use in at least one of simultaneous transmission by the second network device to the first network device and a third device or simultaneous reception by the second network device from the first network device and a third device of at least one operation associated with the allocation information for allocation of the resources to the third device in the in the communication network. Further, to perform receiving, by a second network device from a first network device of a communication network, allocation information for an availability of resources in the communication network; based on the allocation information, determining operations for allocating the resources for use by a third device in the in the communication network; and communicating comprising at least one of simultaneous (Continued)

transmission to the first network device and the third device or simultaneous reception from the first network device and a third device of at least one operation associated with the allocation information for allocation of the resources to the third device in the communication network,

46 Claims, 12 Drawing Sheets

(51) Int. Cl.
*H04B 7/155* (2006.01)
*H04W 88/08* (2009.01)
*H04W 84/04* (2009.01)

(56) References Cited

OTHER PUBLICATIONS

"Introduction of integrated access and backhaul in NR", Samsung, 3GPP TSG-RAN WG1 Meeting #99, R1-913638, Nov. 2019, 5 pages.
"Change Request 38.473, 16.1.0", 3GPP TSG-RAN WG3 Meeting #108-e, R3-204464, Jun. 2020, 139 pgs.

* cited by examiner

INTEGRATED ACCESS-BACKHAUL OPERATION

TECHNICAL FIELD

The teachings in accordance with the exemplary embodiments of this invention relate generally to providing an IAB availability indicator for an availability of resources. and, more specifically, relate to providing an IAB availability indicator for an availability of resources such as a partial availability of resources.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
5GC 5G Core Network
5QI 5G QoS Identifier
AMF Access and Mobility Management Function
ARPI Additional RRM Policy Index
BH Backhaul
CN Core Network
CG Cell Group
CGI Cell Global Identifier
CP Control Plane
DL Downlink
EN-DC E-UTRA-NR Dual Connectivity
EPC Evolved Packet Core
IAB Integrated Access and Backhaul
IMEISV International Mobile station Equipment Identity and Software
NSSAI Network Slice Selection Assistance Information
RANAC RAN Area Code
RIM Remote Interference Management
RIM-RS RIM Reference Signal
RRC Radio Resource Control
S-NSSAI Single Network Slice Selection Assistance Information
SUL Supplementary Uplink
TAC Tracking Area Code
TAI Tracking Area Identity
TCI Transmission Configuration Indicator Wireless communications systems are widely deployed to provide various types of communication capabilities for devices including user equipment and other network devices using multiple-access systems of a network to communicate with one another. Examples of such multiple-access systems include 4G systems such as Long Term Evolution (LTE) type systems, and 5G systems which may be referred to as New Radio (NR) systems. A wireless multiple-access communications system may include a number of base stations or network access nodes to support these communication devices and systems.

It is noted that with more integrated access and backhaul (IAB) links for example, more resources using an expanded bandwidth are expected to be available in NR than in LIE, and thus occasions for the development and deployment of integrated access and backhaul links arise. This allows an easy deployment of a dense network of self-backhauled NR cells in an integrated manner by establishing a plurality of control and/or data channels procedures to provide resources to network devices such as UEs. This system is referred to as an integrated access and backhaul (IAB) link.

Example embodiments of the invention work to address and improve at least the above referenced developments.

SUMMARY

This section contains examples of possible implementations and is not meant to be limiting.

In an exemplary aspect of the invention, there is a method which may be performed by an apparatus in accordance with example embodiments of the invention, comprising determining, by a network device such as a Parent IAB node, Parent Donor Node or Centralized Unit (CU) in a communication network, allocation information for an availability of resources in the communication network; and sending, by the network device, to a second network device, such as an IAB node, the allocation information for use in at least one of simultaneous transmission by the second network device to the first network device, such as a Parent IAB node or Parent Donor Node, and a third device, such as a child IAB node or UE device, or simultaneous reception by the second network device from the first network device and a third device of at least one operation associated with the allocation information for allocation of the resources to the third device in the in the communication network.

A further example embodiment is a method comprising the method and apparatus of the previous paragraph (e.g. Parent IAB node, Donor IAB node or CU), wherein the allocation information comprises information of at least one of spatial division multiplexing information or frequency division multiplexing information for the allocation, wherein the allocation information comprises at least one of an availability indicator indicating the resources are available or a PartialAvailabilityIndication indicating that the resources are only partially available, wherein the allocation information comprises frequency division multiplexing information, wherein the allocation information comprises an indication of resource blocks that should be avoided for the allocation, wherein the allocation information comprises an indication of frequency reservations for the allocation configured at least one of persistently or semi-persistently, wherein the allocation information comprises an indication of a set of frequency resources based on at least one of an initial sub-band and a number of sets of adjacent sub-bands for the allocation, wherein the information is using a bitmap, wherein the allocation information comprises an indication of at least one set of bandwidth configurations of reserved physical resource blocks for the allocation, wherein the allocation information comprises an indication of which distributed unit (DU) of a plurality of distributed units (DUs) is to be configured via a transmission to the at least one child, wherein the allocation information comprises an indication of whether the resources for the distributed unit are available for at least one of an uplink reception from or, a downlink transmission to the at least one child, wherein the allocation information comprises spatial division multiplexing allocation information, and/or wherein sending or communicating the allocation information is using at least one of a physical downlink control channel and a backhaul. Note that the DUs above may exist within an IAB node or a Donor IAB node.

A non-transitory computer-readable medium storing program code, the program code executed by at least one processor to perform at least the method as described in the paragraphs above.

In another example aspect of the invention, there is an apparatus comprising: means for determining, by a network device in a communication network, allocation information for an availability of resources in the communication network; and means for sending, by the network device, to a second network device the allocation information for use in at least one of simultaneous transmission by the second network device to the first network device and a third device or simultaneous reception by the second network device from the first network device and a third device of at least one operation associated with the allocation information for allocation of the resources to the third device in the in the communication network.

In accordance with the example embodiments as described in the paragraph above, at least the means for determining and means for sending comprises a network interface, and computer program code stored on a computer-readable medium and executed by at least one processor.

In still another example aspect of the invention, there is a method which may be performed by an apparatus in accordance with example embodiments of the invention, comprising: receiving, by a second network device from a first network device of a communication network, allocation information for an availability of resources in the communication network; based on the allocation information, determining operations for allocating the resources for use by a third device in the in the communication network; and communicating comprising at least one of simultaneous transmission to the first network device and the third device or simultaneous reception from the first network device and a third device of at least one operation associated with the allocation information for allocation of the resources to the third device in the communication network.

A further example embodiment is a method comprising the method and apparatus of the previous paragraphs, wherein the allocation information comprises information of at least one of spatial division multiplexing allocation information or frequency division multiplexing information for the allocation, wherein the allocation information comprises at least one of an AvailabilityIndication indicating the resources are available or a PartialAvailabilityIndication indicating that the resources are only partially available, wherein the allocation information comprises at least one of frequency division multiplexing information or spatial division multiplexing information, wherein based on the allocation information comprising a PartialAvailabilityIndication and frequency division multiplexing information, the operations comprise marking resource blocks as partially available with a frequency division multiplexing restriction, wherein the operations comprise marking resource blocks that are to be avoided for the allocation, wherein based on the allocation information comprising an AvailabilityIndication and spatial division multiplexing information, wherein the operations comprise scheduling the resource allocation subject to an existing beam constraint, wherein the AvailabilityIndication include parameters related to at least one of mean delay parameters, delay spread parameters, or doppler parameters, wherein the allocation information comprises an indication of at least one of Transmission Configuration Indicator states that have the same delay spread or Transmission Configuration Indicator states that are unavailable, wherein the allocation information comprises an indication of at least one set of bandwidth configurations of reserved physical resource blocks for the allocation, wherein the allocation information comprises an indication of which distributed unit of a plurality of distributed units is to be configured via a transmission to the at least one child, wherein the allocation information comprises an indication of whether the resources for the distributed unit are available for at least one of an uplink, reception, a downlink, transmission by the at least one child, and/or wherein sending or communicating the allocation information is using a physical downlink control channel.

A non-transitory computer-readable medium storing program code; the program code executed by at least one processor to perform at least the method as described in the paragraphs above.

In another example aspect of the invention, there is an apparatus comprising: means for receiving, by a second network device from a first network device of a communication network, allocation information for an availability of resources in the communication network; means, based on the allocation information, for determining operations for allocating the resources for use by a third device in the in the communication network; and means for communicating comprising at least one of simultaneous transmission to the first network device and the third device or simultaneous reception from the first network device and a third device of at least one operation associated with the allocation information for allocation of the resources to the third device in the communication network.

In accordance with the example embodiments as described in the paragraph above, at least the means for receiving, means for determining, and means for communicating comprises a network interface, and computer program code stored on a computer-readable medium and executed by at least one processor.

BRIEF DESCRIPTION OF THE DRAWINGS

The above and other aspects, features, and benefits of various embodiments of the present disclosure will become more fully apparent from the following detailed description with reference to the accompanying drawings, in which like reference signs are used to designate like or equivalent elements. The drawings are illustrated for facilitating better understanding of the embodiments of the disclosure and are not necessarily drawn to scale, in which.

DETAILED DESCRIPTION

In example embodiment of this invention, there is proposed at least a method and apparatus to provide an IAB availability indicator for an availability of resources such as a partial availability of resources.

Example embodiments of the invention relate to 5G New Radio (NR) design. The 5G NR shall be able to allow network deployment with minimized manual effort and with as much automated self-configuration as possible. For these reasons NR supports wireless backhaul to connect relay nodes, known as Integrated Access and Backhaul, IAB nodes, with each other and to base stations with fixed connection. More specifically, NR needs to support self-backhauling where the same carrier is used for backhaul connection as well as for the access links, i.e., enabling in-band backhaul operation.

Figure 1:
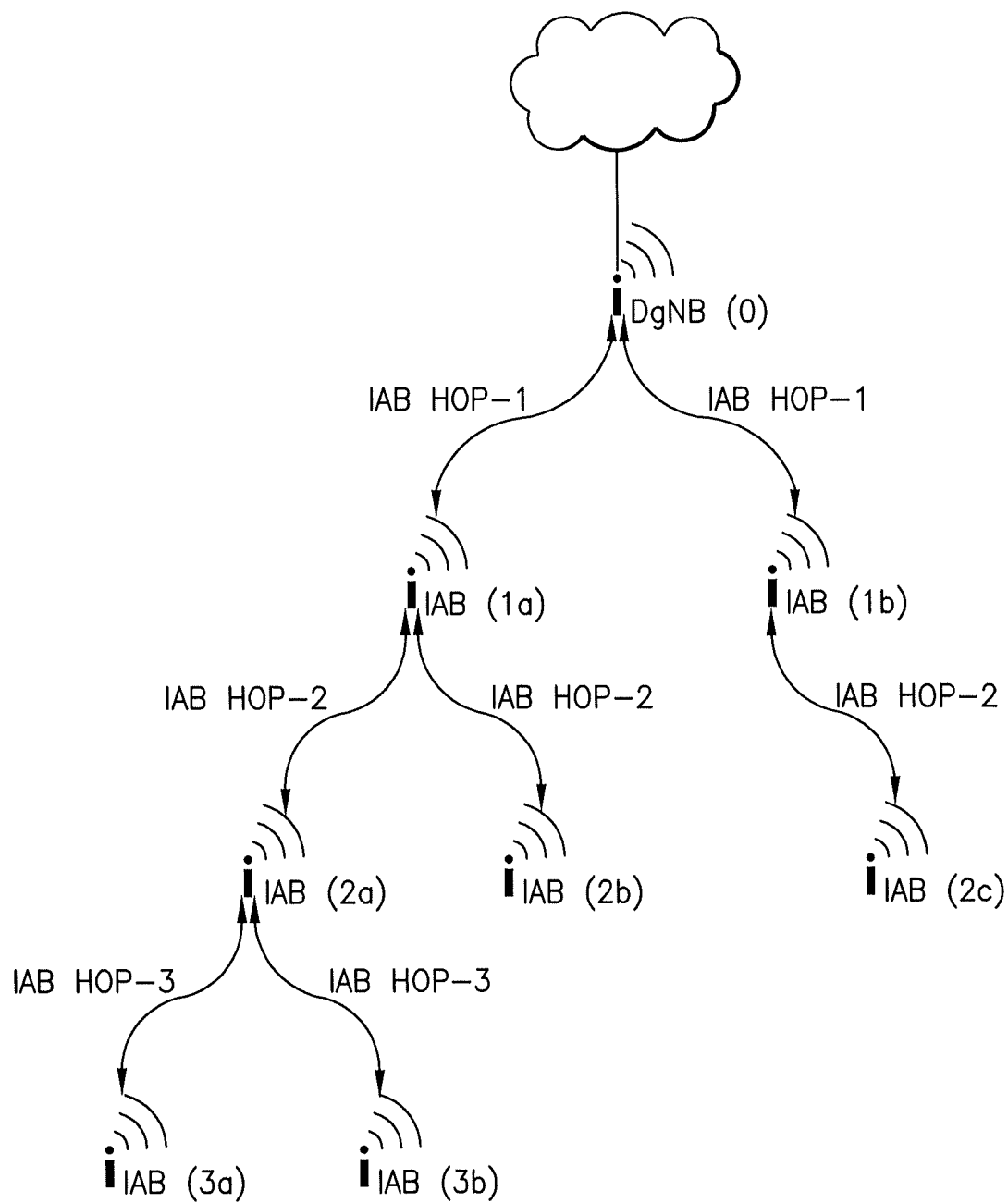
FIG. 1 shows an illustration of Integrated Access and Backhaul tree showing connections between IAB nodes and Donor gNB.

The IAB network will be connected wirelessly with each IAB node receiving service from a parent node, either IAB node or Donor Node, and may provide service to the next hop IAB node, its child. FIG. 1 illustrates a 3 hop IAB network where:

IAB nodes (1a) and (1b) receiving backhaul service from the parent Donor gNB (0);
IAB nodes (2a) and (2b) receiving backhaul service from the parent IAB node (1a);
IAB nodes (2c) receiving backhaul service from the parent IAB node (1b); and
IAB nodes (3a) and (3b) receiving service from the parent IAB node (2a).

Figure 2:
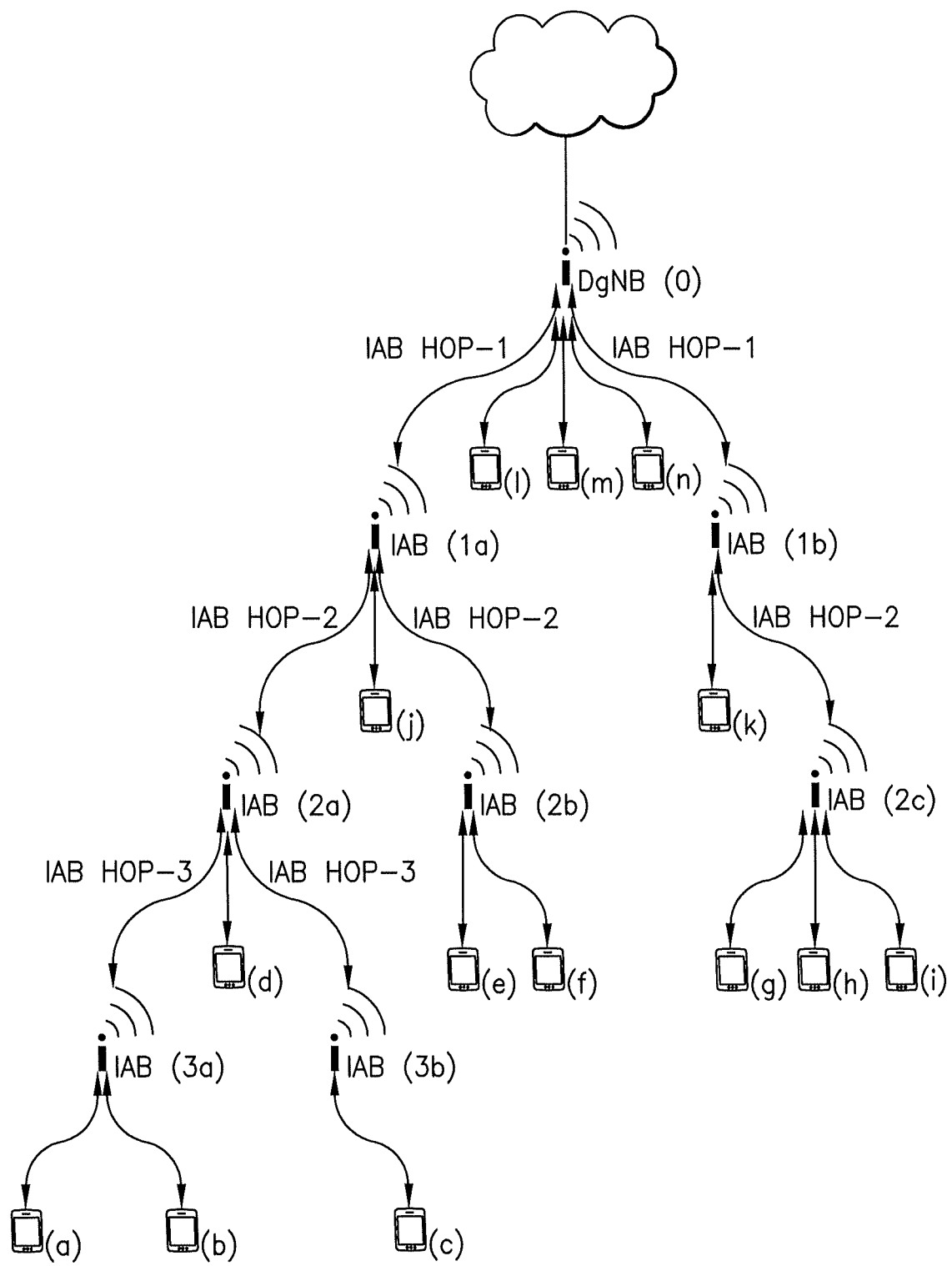
FIG. 2 shows Illustration of UEs attached to the IAB Network.

The IAB network will provide wireless access to a plurality of UEs where each UE will connect directly to a Donor gNB or an IAB node. FIG. 2 illustrates the connection of 14 UEs, lettered (a) through (n), connected to the IAB network at various IAB nodes or directly to the Donor gNB.

Figure 3:
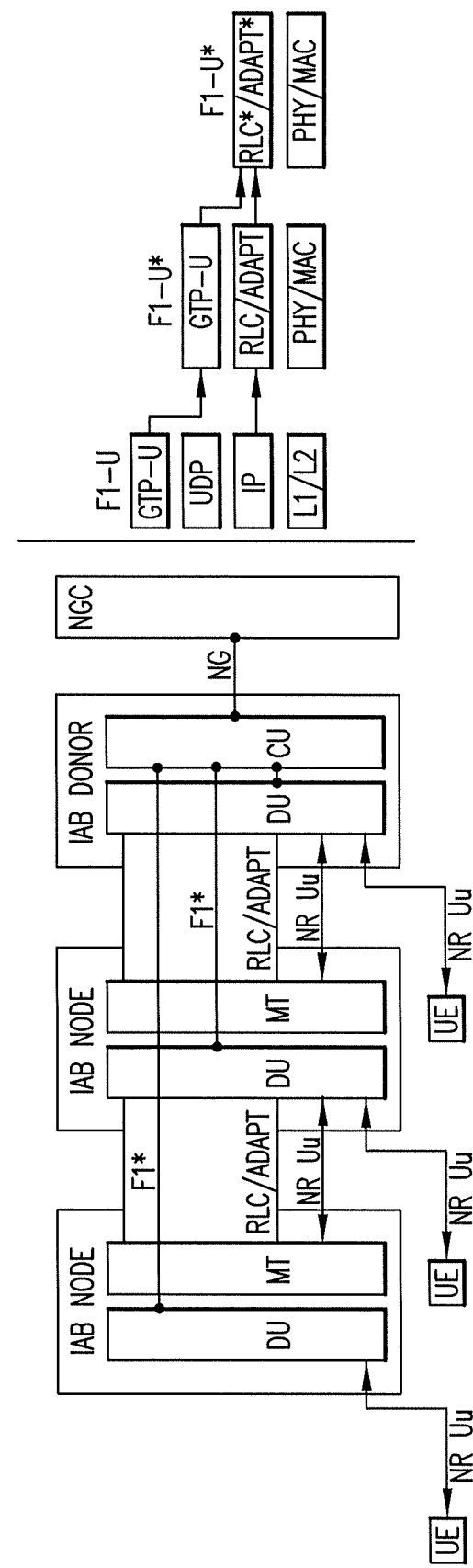
FIG. 3 shows a high-level architecture adopted as the basis for the IAB R16 WI with L2 relaying leveraging the split gNB architecture.

FIG. 3 shows a high-level architecture adopted as the basis for the IAB R16 WI with L2 relaying leveraging the split gNB architecture.

The donor node hosts the centralized unit (CU) for all IAB nodes, i.e. it runs RRC, higher L2 (PDCP) and control functions for the subtending IAB topology. Distributed units (DUs) reside at the IAB nodes hosting the lower L2 radio protocol layers (RLC, MAC) and the physical (PHY) layer. The CU has basically two control interfaces to the IAB nodes, namely RRC connection to the IAB-MT and F1-C to the IAB-DU. Hence both RRC signaling and F1-AP are available for the IAB configuration and control. With this architecture the radio resources usage can have central coordination by the donor CU.

Figure 4:
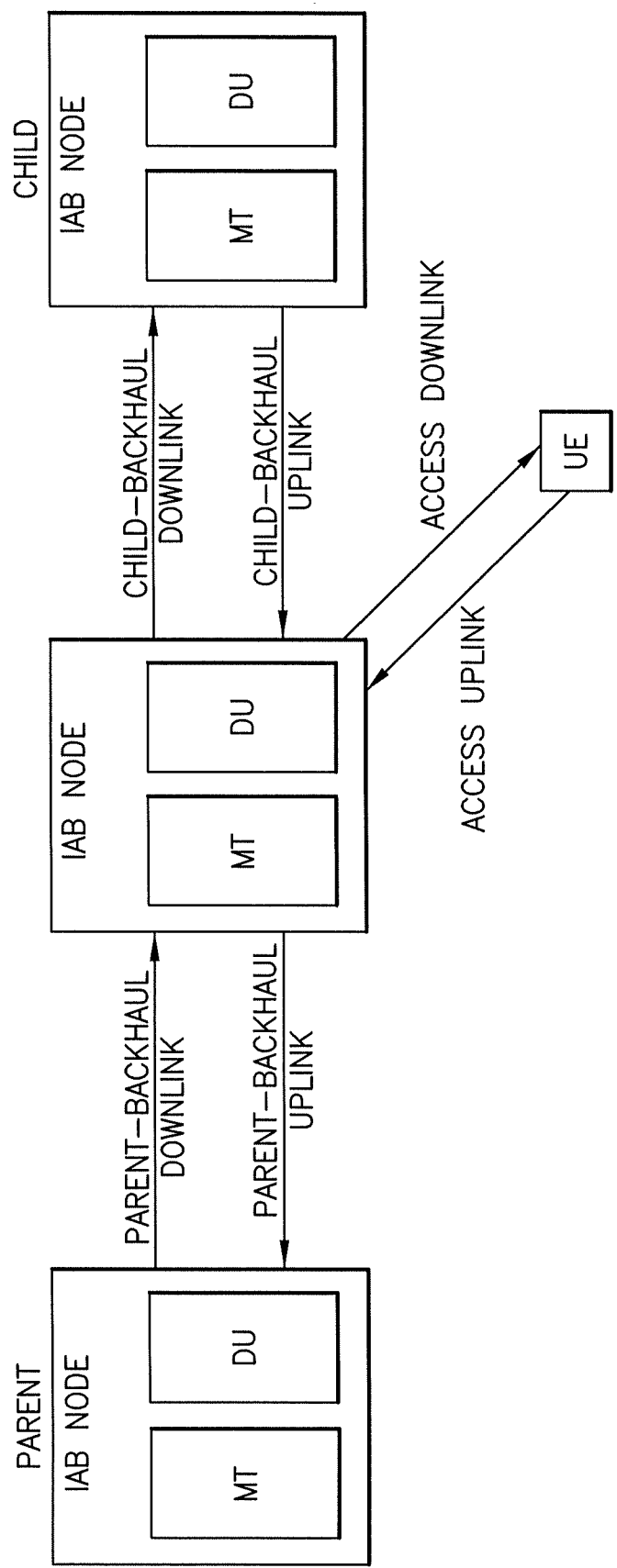
FIG. 4 shows IAB Node relationship to parent and child nodes.

The Donor gNB and IAB nodes must share the wireless resource between backhaul and access. The resources may include wireless spectrum and wireless transceivers. FIG. 4 shows the relationship of an IAB node to Parent IAB node, Child IAB node and access UEs. The IAB node will use the MT function for communicating with the parent node for backhaul service and a gNB Distributed Unit (DU) function for providing wireless access for both UEs and child (next hop) IAB nodes.

The parent DU function located in either the Donor gNB and in the parent IAB nodes will schedule both downlink and uplink access traffic along with the outbound and inbound backhaul traffic for the attached UEs and IAB node UEs, respectively;

IAB MT function and IAB DU function are assumed to share a common transceiver constraining the conditions in which the IAB node DU and IAB node MT utilize the radio resources for both DU access traffic and MT backhaul traffic.

The IAB node may further contain multiple sectors for each respective cell served by each sector. A further constraint is imposed such that all sectors will be either be transmitting or receiving, where the transceivers transmit function may serve outbound backhaul traffic or downlink access traffic and the receive function may serve inbound backhaul traffic and uplink UE traffic.

Figure 5:
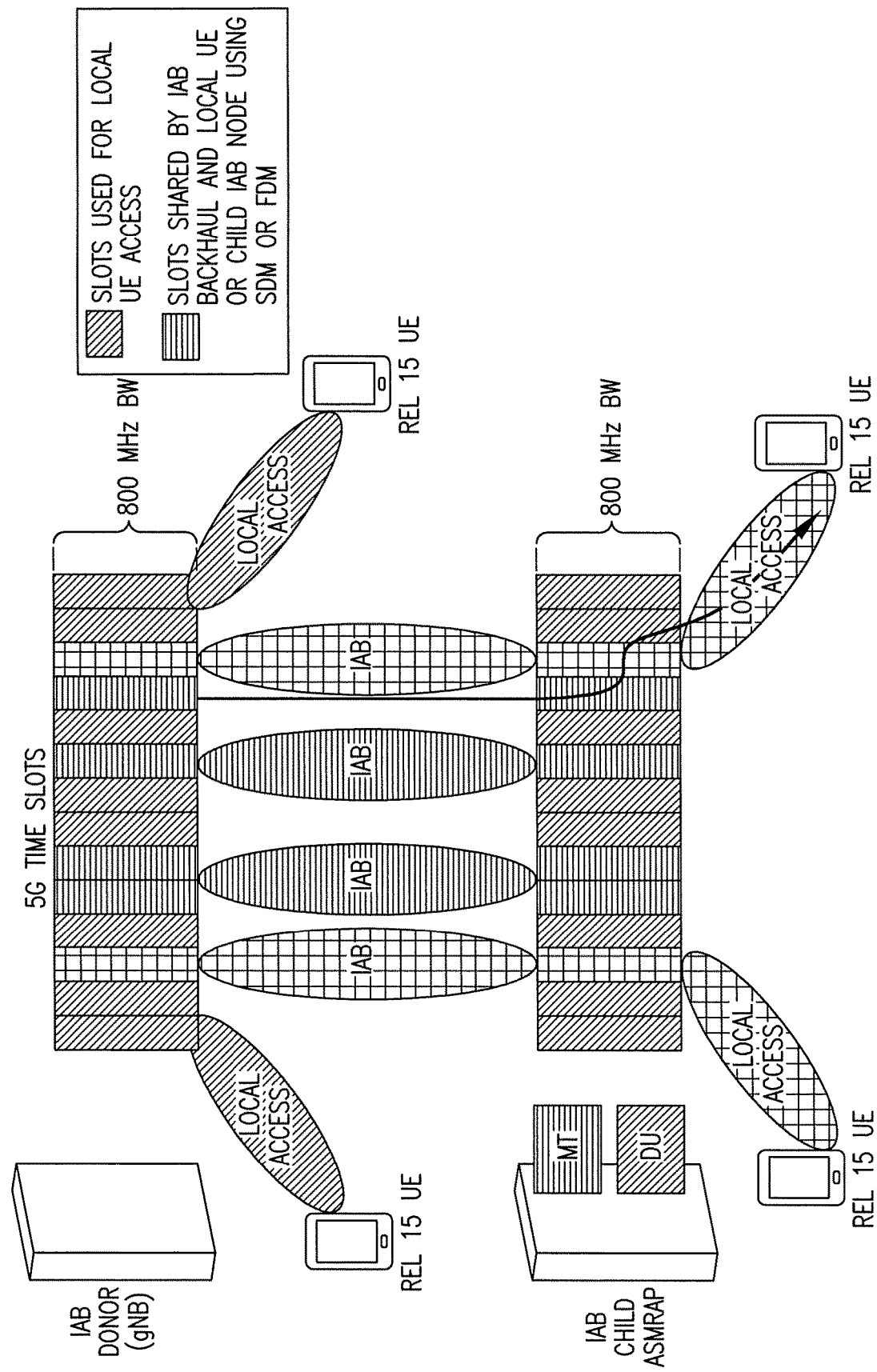
FIG. 5 shows R16 TDM Multiplexing.

IAB R16 WI has defined IAB mechanisms for time-multiplexing access and backhaul. Any given slot or symbol may be used for communication between the IAB node and the parent node; or be used for communication between the IAB node and the child node or access UE. FIG. 5 illustrates the sharing of time slots for access and backhaul.

RP-193251 contains the new R17 WI on "Enhancements to Integrated Access and Backhaul". Duplexing enhancements are proposed to increase spectral efficiency and reduce latency through the support of SDM/FDM-based resource management, through simultaneous transmissions and/or reception on IAB-nodes. Support of simultaneous operation (transmission and/or reception) of IAB-node's child and parent links (i.e., MT Tx/DU Tx, MT Tx/DU Rx, MT Rx/DU Tx, MT Rx/DU Rx).

Prior art at the time of this application defines both semi-static and dynamic mechanisms for sharing resources in a TDM manager between parent node and child nodes/access nodes/UEs/devices. IAB DU symbols within a slot are configured for the TDD configuration as downlink (D), uplink (U) or flexible (F):

D symbols may be used for downlink transmission to the child IAB node or access UE;
U symbols may be used for uplink transmission form the child IAB node or access UE; and
F symbols may be used for either downlink or uplink transmission from the child IAB node or the access UE IAB DU symbols are further configured as hard (H), soft (S) or not available (NA) indicating their availability to the DU:

H symbols are allocated to the DU and the DU may schedule child or access UEs;
S symbols are conditionally allocated to the DU only if they are signaled as available by the parent, or determined to be not in use by the IAB node. Otherwise, the symbols are not available to the DU, but are considered as reserved for the IAB MT; and
NA symbols are not available to the DU and are considered reserved for the MT The IAB DU availability is the inverse of the IAB MT availability. When the IAB DU is configure as H (i.e. available) the IAB MT is not available for parent backhaul. When the IAB DU is configured as NA (i.e. not available) the IAB MT is available for parent backhaul. When the IAB DU is configured as S (i.e. conditionally available) then the IAB MT is conditionally available. Given the that the IAB MT availability is constrained by the IAB DU availability, the parent DU is also informed of its child DU availability so that it may properly schedule the backhaul link.

In the 3GPP specifications, the DU is semi-statically configured with F1AP as defined in R3-204464 (BL CR) sections 9.2.x.3 and the resource configurations in 9.3.1.r. The F1AP configures both symbol the TDD configuration and the IAB DU availability. The F1AP signally is also used to inform the parent DU of the child IAB DU's semi-static configuration.

R1-1913638 CR_38.213_IAB-Core defines the dynamic mechanism for signaling the availability of IAB symbols marked as S. The parent DU use the IAB signaling at the MAC layer to redefine the TDD configuration (D/U/F) with either:
tdd-UL-DL-ConfigDedicated-IAB-MT; and/or
SlotFormatCombinationsPerCell-IAB-MT The parent DU can also use MAC signally to indicate the availability of IAB DU's conditionally available, S, symbols. Note, that the NA and H symbols can only be reconfigured using F1AP signaling by the CU. For S symbols, the AvailabilityIndicator can signal resourceAvailability indicating the availability of soft symbols. When a downlink, uplink, or flexible symbol is configured as soft, the IAB-node DU can respectively transmit, receive or either transmit or receive in the symbol only if:

for the IAB-node MT, ability to transmit or receive by the IAB-node DU in the soft symbol is equivalent to a configuration of the soft symbol as unavailable; or the IAB-node DU detects a DCI format 2_5 with an AvailabilityIndicator index field value indicating the soft symbol as available for transmission or reception For SDM/FDM operation the resources do not fall cleanly in the H/S/NA as the IAB MT and IAB DU will use the resources simultaneously. The resources are effectively shared between the parent and the child:

For FDM the parent will have the IAB MT transmit/receive using a subset of the RBs partitioned in frequency while the IAB DU would only be allowed to use the remaining RBs for the child or access transmissions; or For SDM the parent will have the IAB MT transmit/receive using a spatial beam transmitted at the parent node. The IAB DU would effectively be restricted to beams that do not interfere with the parent transmission.

For both FDM and SDM, there is a need to signal the partial availability of resources. Therefore, this invention introduces the concept of partial availability of resources.

Figure 10:
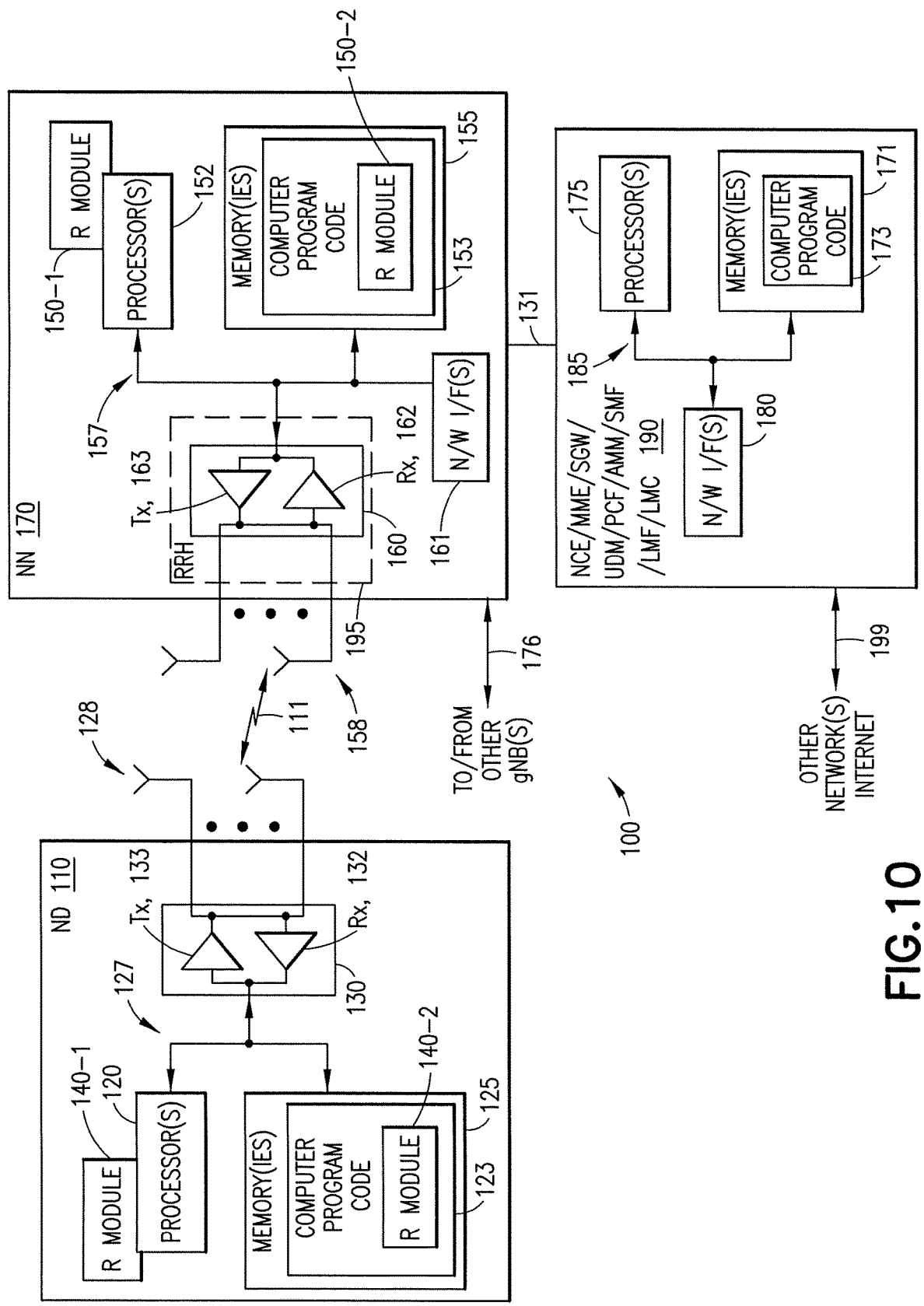
FIG. 10 shows a high level block diagram of various devices used in carrying out various aspects of the invention.

Before describing the example embodiments of the invention in further detail reference is made to FIG. 10. FIG. 10 shows a block diagram of one possible and non-limiting exemplary system in which the exemplary embodiments may be practiced.

As shown in FIG. 10, a Network Device ND 110 which can be a Parent Node serving user equipment (UE) is in wireless communication with a wireless network 100. A UE is a wireless, typically mobile device that can access a wireless network. The ND 110 includes one or more processors 120, one or more memories 125, and one or more transceivers 130 interconnected through one or more buses 127. Each of the one or more transceivers 130 includes a receiver Rx, 132 and a transmitter Tx 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The ND 110 may include an R Module 140 or Resource Module which is configured to perform the example embodiments of the invention as described herein. The R Module 150 may be implemented in hardware by itself of as part of the processors and/or the computer program code of the ND 110. The R Module 140 comprising one of or both parts 140-1 and/or 140-2, which may be implemented in a number of ways. The R Module 140 may be implemented in hardware as R Module 140-1, such as being implemented as part of the one or more processors 120. The R Module 140-1 may be implemented also as an integrated circuit or through other hardware such as a programmable gate array. In another example, the R Module 140 may be implemented as R Module 140-2, which is implemented as computer program code 123 and is executed by the one or more processors 120. Further, it is noted that the R Modules 140-1 and/or 140-2 are optional. For instance, the one or more memories 125 and the computer program code 123 may be configured, with the one or more processors 120, to cause the user equipment 110 to perform one or more of the operations as described herein. The ND 110 communicates with the Network Node NN 170 via a wireless link 111.

The NN 170 (can be a network node such as an NR/5G IAB Node or a base station such as a Node B or possibly an evolved NB) is a base station (e.g., for LTE, long term evolution) that provides access by wireless devices such as the ND 110 to the wireless network 100. The NN 170 includes one or more processors 152, one or more memories 155, one or more network interfaces (N/W I/F(s)) 161, and one or more transceivers 160 interconnected through one or more buses 157. Each of the one or more transceivers 160 includes a receiver Rx 162 and a transmitter Tx 163. The one or more transceivers 160 are connected to one or more antennas 158. The one or more memories 155 include computer program code 153. The NN 170 includes an R Module 150 which is configured to perform example embodiments of the invention as described herein. The R Module 150 may comprise one of or both parts 150-1 and/or 150-2, which may be implemented in a number of ways. The R Module 150 may be implemented in hardware by itself or as part of the processors and/or the computer program code of the NN 170. R Module 150-1, such as being implemented as part of the one or more processors 152. The R Module 150-1 may be implemented also as an integrated circuit or through other hardware such as a programmable gate array. In another example, the R Module 150 may be implemented as R Module 150-2, which is implemented as computer program code 153 and is executed by the one or more processors 152. Further, it is noted that the R Modules 150-1 and/or 150-2 are optional. For instance, the one or more memories 155 and the computer program code 153 may be configured to cause, with the one or more processors 152, the NN 170 to perform one or more of the operations as described herein. The one or more network interfaces 161 communicate over a network such as via the links 176 and 131. Two or more NN 170 may communicate using, e.g., link 176. The link 176 may be wired or wireless or both and may implement, e.g., an X2 interface.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the NN 170 being physically in a different location from the RRH, and the one or more buses 157 could be implemented in part as fiber optic cable to connect the other elements of the NN 170 to the RRH 195.

It is noted that description herein indicates that "cells" perform functions, but it should be clear that the Network Node and/or a gNB that forms the cell will perform the functions. The cell makes up part of a gNB or NN. That is, there can be multiple cells per gNB.

The wireless network 100 may include a NCE/MME/SGW/UDM/PCF/AMM/SMF/LMF/LMC 190, which can comprise a network control element (NCE), and/or serving gateway (SGW) 190, and/or MME (Mobility Management Entity) and/or SGW (Serving Gateway) functionality, and/or user data management functionality (UDM), and/or PCF (Policy Control) functionality, and/or Access and Mobility (AMF) functionality, and/or Session Management (SMF) functionality, Location Management Function (LMF), Location Management Component (LMC) and/or Authentication Server (AUSF) functionality and which provides connectivity with a further network, such as a telephone network and/or a data communications network (e.g., the Internet), and which is configured to perform any 5G and/or NR operations in addition to or instead of other standards operations at the time of this application. The NCE/MME/SGW/UDM/PCF/AMM/SMF/LMF/LMC 190 is configurable to perform operations in accordance with example embodiments of the invention in any of an LTE, NR, 5G and/or any standards-based communication technologies being performed or discussed at the time of this application.

The NN 170 is coupled via a link 131 to the NCE/MME/SGW/UDM/PCF/AMM/SMF/LMF/LMC 190. The link 131 may be implemented as, e.g., an S1 interface or N2 interface. The NCE/MME/SGW/UDM/PCF/AMM/SMF/LMF/LMC 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE/MME/SGW/UDM/PCF/AMM/SMF/LMF/LMC 190 to perform one or more operations. In addition, the NCE/MME/SGW/UDM/PCF/AMM/SMF/LMF/LMC 190, as are the other devices, is equipped to perform operations of such as by controlling the ND 110 and/or NN 170 for 5G and/or NR operations in addition to any other standards operations implemented or discussed at the time of this application.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions and other functions as described herein to control a network device such as the ND 110, NN 170, and/or NCE/MME/SGW/UDM/PCF/AMM/SMF/LMF/LMC 190 as in FIG. 10.

It is noted that functionality(ies), in accordance with example embodiments of the invention, of any devices as shown in FIG. 10 e.g., the ND 110 and/or NN 170 can also be implemented by other network nodes, e.g., a wireless or wired relay node (a.k.a., integrated access and/or backhaul (IAB) node). In the IAB case, UE functionalities may be carried out by MT (mobile termination) part of the IAB node, and gNB functionalities by DU (Data Unit) part of the IAB node, respectively. These devices can be linked to the ND 110 as in FIG. 10 at least via the wireless link 111 and/or via the NCE/MME/SGW/UDM/PCF/AMM/SMF/LMF/LMC 190 using link 199 to Other Network(s)/Internet as in FIG. 10.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

It is noted that any reference to a network device or a device in this application or the Figures is not limiting to a type of device. It can be assumed that any reference to a device or node can be referring to an IAB node, Donor node, CU device, or a user equipment, or even a different type of equipment associated with a communication network.

Example embodiments of the invention provide a method and apparatus to perform procedures as detailed herein to provide resources to network devices. Such an apparatus or receiving device can be any device such an IAB node, Donor node, and/or CU node. No reference herein to a device or node is limiting to a particular type of device.

As indicated above, for both FDM and SDM, there is a need to signal the partial availability of resources. Example embodiments of the invention introduce the concept of partial availability of resources.

According to Embodiment 1, IAB SDM/FDM allocations would be limited to soft resource only. H resources for the DU would remain solely in the DU's control to schedule as it likes. NA resources for DU would then be assumed to remain unscheduled by the IAB DU and reserved for parent transmission.

One example embodiment of the invention provides that IAB availability indicator should be modified to send the partial availability of a resource:

For FDM, the parent must signal what resources it will be using for the parent backhaul. For uplink parent allocation, the RB availability could be derived directly for the MT UL grant as it comes one slot in advance. The available RBs would be those which are not allocated for the MT. For the downlink, a new message is required to signal the RBs that will be allocated in the slot. Alternatively, the parent can explicitly signal which resources are available in the slot; and For SDM, the parent should signal that it intends to schedule a backhaul transmission during the slot. The parent may further restrict the beam and/or panel selection of the child for access links indicated by a minimum crosstalk power or angular restriction. If child DU has F-S resources, AI signaling would tell which link direction is available.

According to Embodiment 2, besides or instead of Embodiment 1, the partial availability is extended to U- or D-H resources: a semi static CU configuration indicates that an H resource is available for DU with some constraints:

For FDM, IAB DU would be given full control of resources in some RBs; or

For SDM, IAB DU would be indicated that MT might be scheduled for reception in some U-H symbols (for those symbols, IAB DU schedules only access ULs whose signals allow simultaneous IAB MT reception) or IAB DU would not be allowed to transmit in some beams during a DL-H symbol.

In this embodiment, the CU may communicate these constraints directly to both the parent Node, acting as first network device and the second network device which is the IAB node. The first and second network devices could take these constraints into consideration independently.

Figure 6:
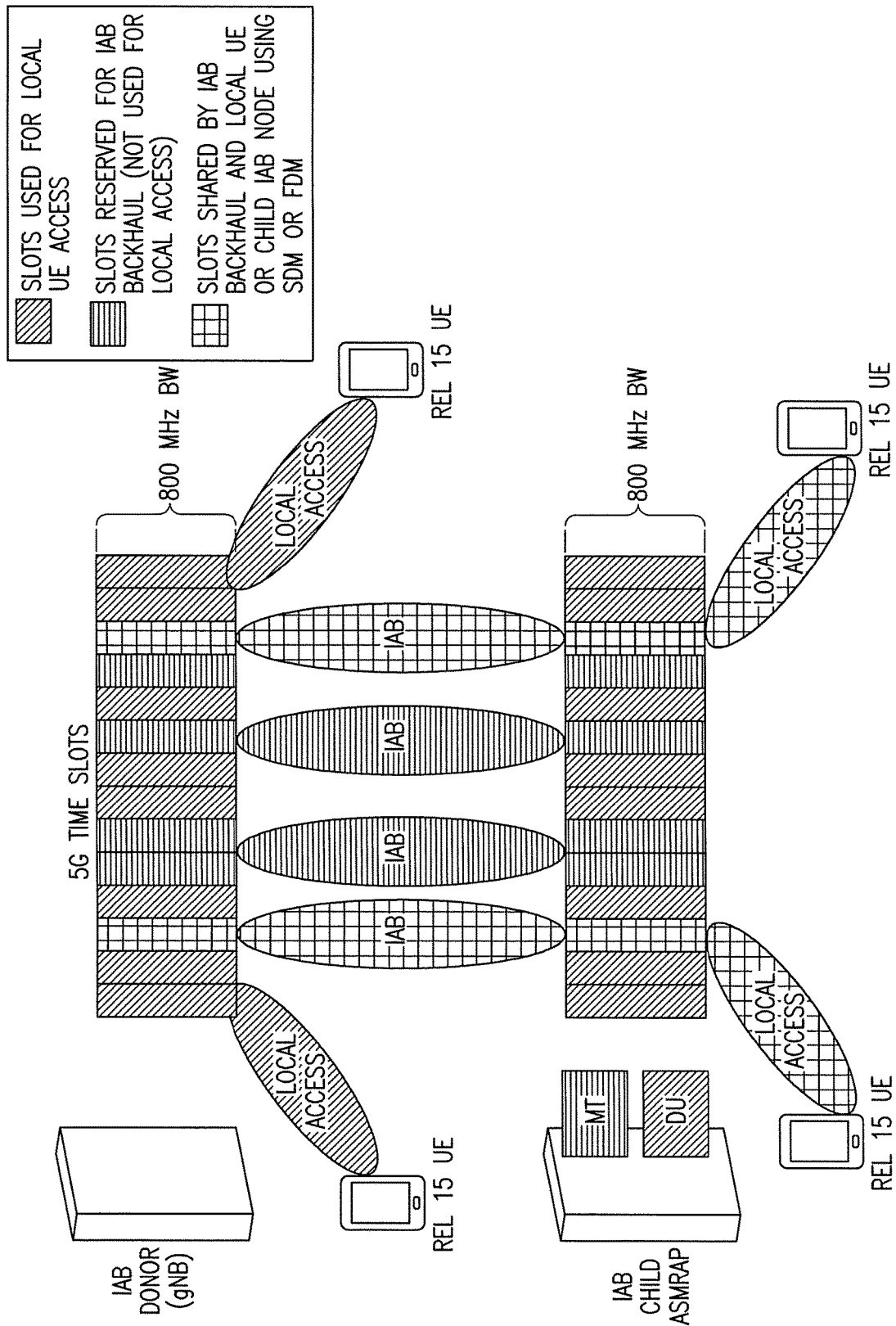
FIG. 6 shows SDM/FDM Multiplexing.

FIG. 6 shows the case where an IAB node is sharing resources between parent backhaul and access. In these cases, the IAB MT is actively communicating with the parent node (either IAB node or Donor gNB) while the IAB DU is simultaneously communicating with an access UE or child IAB node, potentially using the same radio resources. The transmissions in this case would need to be either FDM or SDM. Since the IAB parent backhaul is scheduled by the parent DU (e.g. Donor gNB) and the child node (e.g. access UE or child IAB node MT) is scheduled by the IAB DU, the resources for the FDM and SDM transmissions must be coordinated. Thus, it is proposed that the parent backhaul will indicate a partial availability of resources to the IAB node so that the IAB DU may take appropriate action.

Several flow charts may be prepared for the current invention where the Parent DU transmits the partial availability information, the IAB MT receives the partial availability information and the IAB DU determines a schedule considering the partial availability information.

Figure 7:
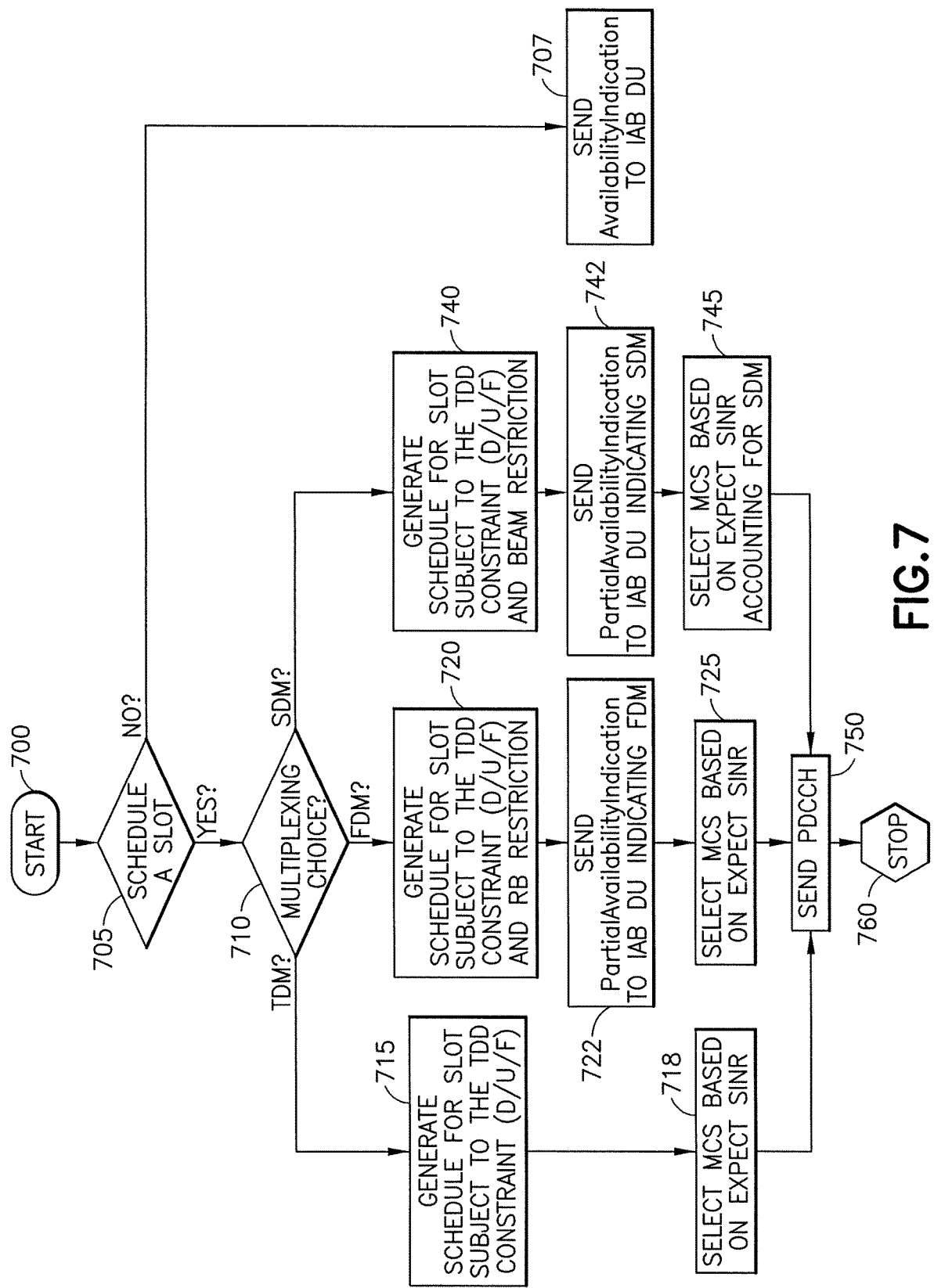
FIG. 7 shows a Parent DU flow chart.

FIG. 7 shows the flow chart for the parent DU. As shown in FIG. 7, after step 700 there is determining whether to schedule a slot in step 705 of FIG. 7. If yes, then as shown in step 710 there is determining a multiplexing choice. If the choice is TDM, then as shown in step 715 there is generating a schedule for a slot subject to TDD constraint (D/U/F). The as shown in step 718 of FIG. 7 there is selecting an MCS based on expected SINR. If the choice is FDM, then as shown in step 720 of FIG. 7 there is generating a schedule for a slot subject to TDD constraint (D/U/F) and RB restriction. Then as shown in step 722 of FIG. 7 there is sending PartialAvailabilityindication to IAB DU indicating FDM. Then as shown in step 725 of FIG. 7 there is selecting an MCS based on expected SINR. If the choice is SDM, then as shown in step 740 of FIG. 7 there is generating a schedule for a slot subject to TDD constraint (D/U/F) and Beam restriction. As shown in step 742 of FIG. 7 there is sending PartialAvailabilityindication to IAB DU indicating SDM. Then as shown in step 745 of FIG. 7 there is selecting an MCS based on expected SINR accounting for SDM. In all these choices the result as shown in step 750 of FIG. 7 is sending PDCCH. In addition, if at step 705 the determination is No then as shown in step 707 of FIG. 7 there is sending AvailabilityIndication to IAB DU. Finally, as shown in step 760 of FIG. 7 there is a Stop.

As shown in FIG. 7 the parent DU determines whether data needs to be sent to the IAB node over the backhaul in step 705. If not, the parent DU will send an availability indicator to the IAB DU releasing the resources for the TDM resource and indicating the S resources as available. If the parent DU determines that data should be sent over the backhaul, the parent will then need to select the multiplexing method. If there is enough data to fill an entire time resource, then the parent may choose the TDM multiplexing option. If TDM, then the parent DU will generate a schedule for the slot subject to the TDD constraint and also select the Modulation and Coding Scheme (MCS) based on the expected SINR. Finally, the parent DU will indicate the schedule to an IAB Node, comprised of an MT and DU, with a PDCCH indicating downlink allocation or uplink grant for either an outbound or inbound backhaul transmission, respectively.

The parent DU may also determine that data should be sent over the backhaul but not all resources are needed. In this case, the parent DU may choose the FDM multiplexing. In this case, the parent DU will generate a schedule for the slot subject to the TDD constraint and restricted Resource Block (RB) selection. The parent DU would then send a PartialAvailabilityIndication to the IAB DU indicating that resources are only partially available subject to the FDM multiplexing constraint and would further indicate which RBs may be used by the IAB DU. Alternatively, the parent DU may indicate which RBs it is using such that they be avoided by the IAB DU.

Frequency reservations may be configured persistently/semi-persistently (e.g., RRC configuration) or dynamically (e.g. DCI) or via a combination of both persistent and dynamic methods. A CU may configure a set of contiguous frequency resources by indicating the initial sub-band (e.g. PRB), and number of additionally adjacent subbands (e.g., number of adjacent PRBs). Non-contiguous frequency allocations can be maintained through a mapping of contiguous virtual resources to non-contiguous physical resources (e.g. VRB-to-PRB mapping). Additionally, a CU may configure an IAB DU with a number of contiguous sub-bands (e.g. M sets of N contiguous PRBs). A DU may then indicate which of the sub-bands is reserved via dynamic signaling (e.g. bit map of configured sub-band availability). Additionally, a CU may explicitly configure a discrete set of bandwidth configurations (e.g. N configurations of various reserved/available PRBs) and indicate which configuration is used via index.

The CU may also indicate which DU of a plurality of DUs is being configured via transmission to its corresponding MT. The CU may also indicate explicitly whether the resources available for the DU are available for UL Rx, DL Tx, or flexible.

Lastly, the parent DU may determine that spatial multiplexing is appropriate for backhaul transmission based on required resources and expected crosslink interference. In this case, the parent DU may choose SDM as the multiplexing choice. In this case, the parent DU will generate a schedule for the slot subject to the TDD constraint. The parent DU will then inform the IAB DU that the resources are partially available with the PartialAvailbilityIndication indicating that SDM will be used and possibly what beam and/or panel restrictions may be necessary. The parent DU will then select the MCS based on the expected SINR accounting for any crosslink interference. Finally, the parent DU will send a PDCCH indicating the schedule to the IAB DU.

Figure 8:
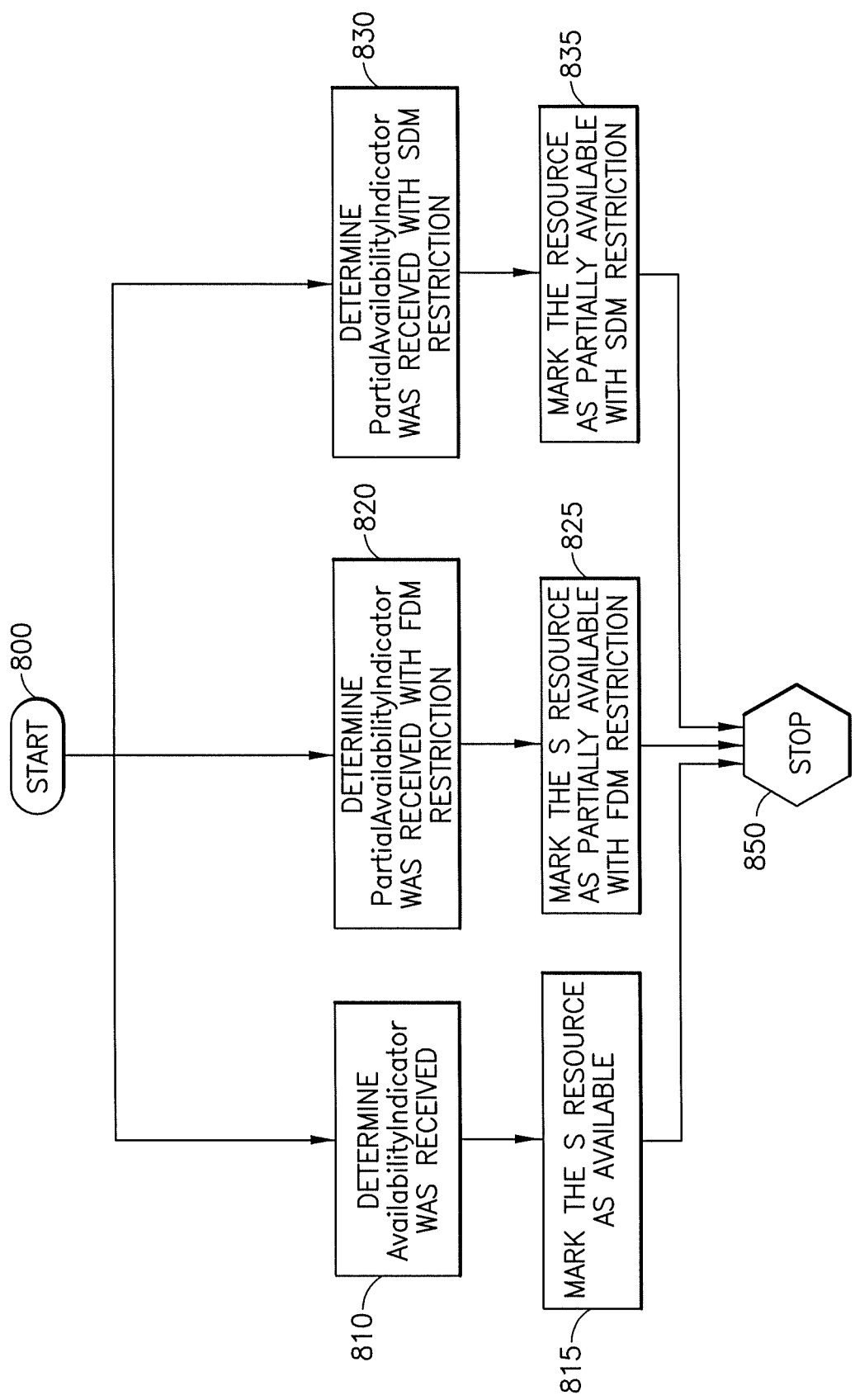
FIG. 8 shows an IAB MT flow chart.

Similar to frequency reservations, spatial reservations may be configured using persistent/semi-persistent, dynamic signaling, or a combination of the two. A CU may mitigate CLI between MT and DU, by barring use of TCI states for DU Tx/RX. Barred TCI states may be determined by the DU implicitly by detection of the TCI state on which the availability indicator was received by its corresponding MT. Additionally, the indicated DU may determine additional TCI states which are barred, by QCL association (e.g. QCL-D spatial metric) with additional configured TCI states. Additionally, barred TCI states may be explicitly signaled to the designated DU, as well as a QCL indication which may reveal additional TCI states with similar propagation characteristics which are to be barred FIG. 8 shows the flow chart for the IAB MT. As shown in step 800 of FIG. 8 there is a Start. As shown in an alternative step 810 of FIG. 8 there is determining whether an AvailabilityIndicator was received. If so, then at step 815 of FIG. 8 there is marking the S resource as available. As shown in alternative step 820 there is determining a PartialAvailabilityIndicator was received with FDM restriction. If so, then as shown in step 825 of FIG. 8 there is marking the S resource as partially available with FDM restriction. In another alternative step 830 of FIG. 8 there is determining a PartialAvailabilityIndicator was received with SDM restriction. If so, then as shown in step 835 of FIG. 8 there is marking the S resource as partially available with SDM restriction. Then as shown in step 850 of FIG. 8 there is a Stop.

As shown in FIG. 8, the IAB MT will receive either the AvailabilityIndicator or the PartialAvailabilityIndicator from the parent DU and mark the S resources appropriately. If the AvailbilityIndicator was received, then the IAB MT will mark the S resources as available for the IAB DU. If the PartialAvailbilityIndicator was received with FDM restriction, then the IAB MT will mark the S resources as partially available with an FDM restriction. The IAB MT will further identify which RBs the IAB DU will be restricted to or alternatively which resources are expected to be used by the parent DU and must be avoided.

Lastly, if the PartialAvailabilityIndicator was received with SDM restriction, then the IAB MT will mark the S resources as partially available with an SDM restriction. The IAB MT may further mark the resources with a beam and/or panel restriction if so indicated by the PartialAvailability-Indication.

Figure 9:
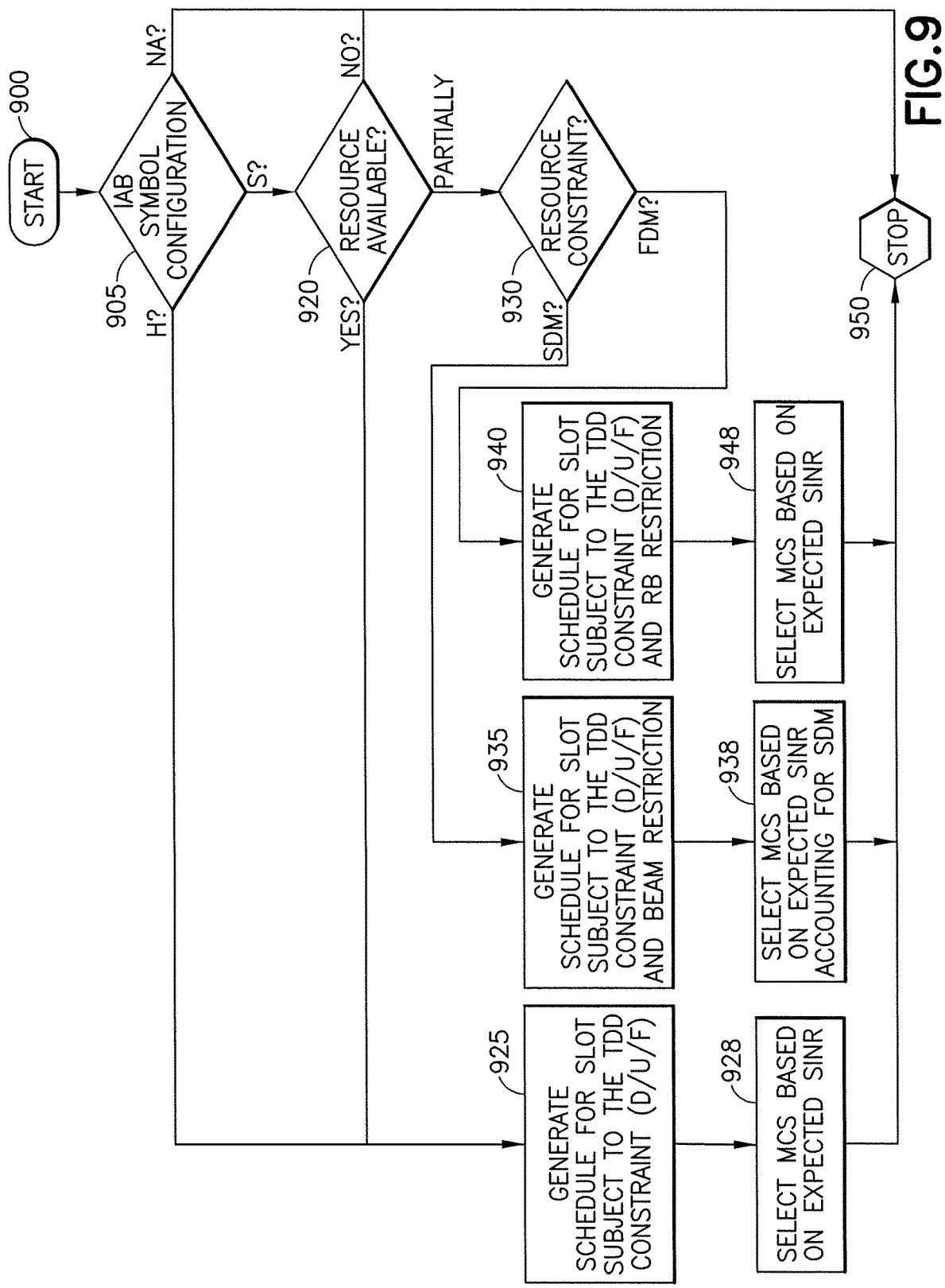
FIG. 9 shows IAB DU flow chart according to Embodiment 1 in accordance with example embodiments of the invention.

FIG. 9 shows the flow chart for the IAB DU according to Embodiment 1. As shown in step 900 of FIG. 9 there is a Start. As shown in step 905 of FIG. 9 there is an IAB symbol configuration. If H? then as shown in step 925 there is generating schedule for slot subject to TDD constraint (D/U/F). Then as shown in step 928 of FIG. 9 there is selecting MCS based on expected SINR. As shown in step 920 of FIG. 9 there is determining whether a Resource is available. If Yes? then step 925 of FIG. 9 is applicable. Then as shown in step 930 of FIG. 9 there is determining a Resource constraint as SDM or FDM. If SDM?, there is as shown in step 935 of FIG. 9 there is generating schedule for slot subject to TDD constraint (D/U/F) and Beam restriction. Then as shown in step 938 of FIG. 9 there is selecting MCS based on expected SINR accounting for SDM. If FDM?, there is as shown in step 940 of FIG. 9 generating schedule for slot subject to the TDD constraint (D/U/F) and RB restriction. Then as shown in step 948 of FIG. 9 there is selecting MCS based on expected SINR. For all cases there is as shown in step 950 of FIG. 9 a resulting Stop.

As shown in FIG. 9 the IAB DU will determine whether a symbol is available being H, S or NA. If the symbol is H, the IAB may schedule the resource without restriction other than the TDD constraint. If the symbol is NA, the IAB DU may not schedule the resource. If the symbol is S, then the IAB must determine whether it is available or only partially available. If the resource is available, then the IAB may schedule the resource without restriction other than the TDD constraint. The MCS would be selected on the expected SINR. If the resource is partially available, then the IAB DU may schedule resource on the type of constraint. If the resource constraint is SDM, then the IAB DU may schedule the resource subject to any beam constraints that may exist. Further the IAB DU would select the MCS based on the expected SINR accounting for the crosslink interference anticipated with SDM. If the resource constraint is FDM, the IAB DU would generate a schedule for the slot subject to the TDD constraint and also the RB restriction. As usual, the MCS would be based on the expected SINR.

Figure 11A:
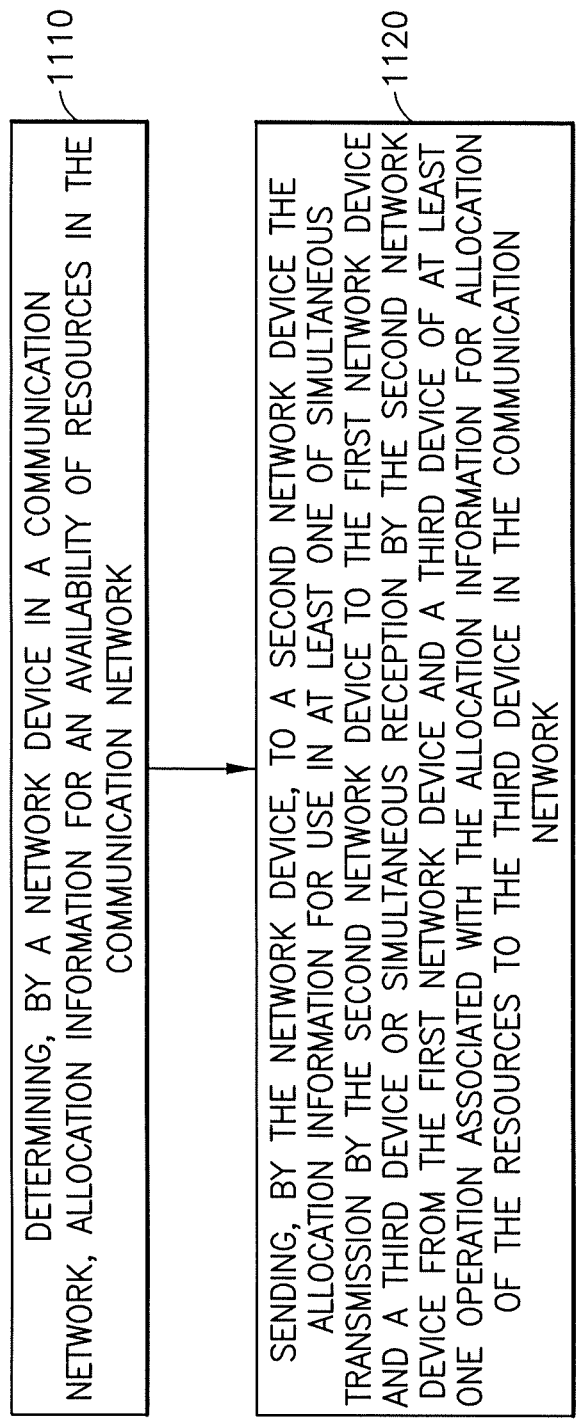
FIG. 11A and FIG. 11B each show a method which may be performed by an apparatus in accordance with example embodiments of the invention.

FIG. 11A shows a method in accordance with example embodiments of the invention which may be performed by an apparatus such as the network device or an ND 110 as in FIG. 10 or a parent device of a communication network. As shown in step 1110 of FIG. 11A there is determining, by a network device in a communication network, allocation information for an availability of resources in the communication network. Then as shown in step 1120 of FIG. 11A there is sending, by the network device, to a second network device the allocation information for use in at least one of simultaneous transmission by the second network device to the first network device and a third device or simultaneous reception by the second network device from the first network device and a third device of at least one operation associated with the allocation information for allocation of the resources to the third device in the in the communication network.

In accordance with example embodiments as described in the paragraph above, wherein the allocation information comprises information of at least one of spatial division multiplexing allocation information or frequency division multiplexing information for the allocation.

In accordance with example embodiments as described in the paragraphs above, wherein the allocation information comprises at least one of an availability indicator indicating the resources are available or a PartialAvailabilityIndication indicating that the resources are only partially available.

In accordance with example embodiments as described in the paragraphs above, wherein the allocation information comprises frequency division multiplexing information.

In accordance with example embodiments as described in the paragraphs above, wherein the allocation information comprises an indication of resource blocks that should be avoided for the allocation.

In accordance with example embodiments as described in the paragraphs above, wherein the allocation information comprises an indication of frequency reservations for the allocation configured at least one of persistently or semi-persistently.

In accordance with example embodiments as described in the paragraphs above, wherein the allocation information comprises an indication of a set of frequency resources based on at least one of an initial sub-band and a number of sets of adjacent sub-bands for the allocation.

In accordance with example embodiments as described in the paragraphs above, wherein the information is using a bitmap.

In accordance with example embodiments as described in the paragraphs above, wherein the allocation information comprises an indication of at least one set of bandwidth configurations of reserved physical resource blocks for the allocation.

In accordance with example embodiments as described in the paragraphs above, wherein the allocation information comprises an indication of which distributed unit of a plurality of distributed units is to be configured via a transmission to the at least one child.

In accordance with example embodiments as described in the paragraphs above, wherein the allocation information comprises an indication of whether the resources for the distributed unit are available for at least one of an uplink reception from or, a downlink transmission to the at least one child.

In accordance with example embodiments as described in the paragraphs above, wherein the allocation information comprises spatial division multiplexing allocation information.

In accordance with example embodiments as described in the paragraphs above, wherein sending the allocation information is using at least one of a physical downlink control channel and a backhaul.

A non-transitory computer-readable medium (Memory(ies) 125 as in FIG. 10) storing program code (Computer Program Code 123 and/or R Module 140-2 as in FIG. 10), the program code executed by at least one processor (Processor(s) 120 and/or R Module 140-1 as in FIG. 10) to perform the operations as at least described in the paragraphs above.

In accordance with an example embodiment of the invention as described above there is an apparatus comprising: means for determining (one or more transceivers 130; Memory(ies) 125; Computer Program Code 123 and/or R Module 140-2; and Processor(s) 120 and/or R Module 140-1 as in FIG. 10), by a network device ND 110 as in FIG. 10) in a communication Network 100 as in FIG. 10), allocation information for an availability of resources in the communication network; and means for sending (one or more transceivers 130; Memory(ies) 125; Computer Program Code 123 and/or R Module 140-2; and Processor(s) 120 and/or R Module 140-1 as in FIG. 10), by the network device, to a second network device the allocation information for use in at least one of simultaneous transmission by the second network device to the first network device and a third device or simultaneous reception by the second network device from the first network device and a third device of at least one operation associated with the allocation information for allocation of the resources to the third device in the in the communication network.

In the example aspect of the invention according to the paragraph above, wherein at least the means for determining and means for sending comprises a non-transitory computer readable medium [Memory(ies) 125 as in FIG. 10] encoded with a computer program [Computer Program Code 123 and/or R Module 140-2 as in FIG. 10] executable by at least one processor [Processor(s) 120 and/or R Module 140-1 as in FIG. 10].

Figure 11B:
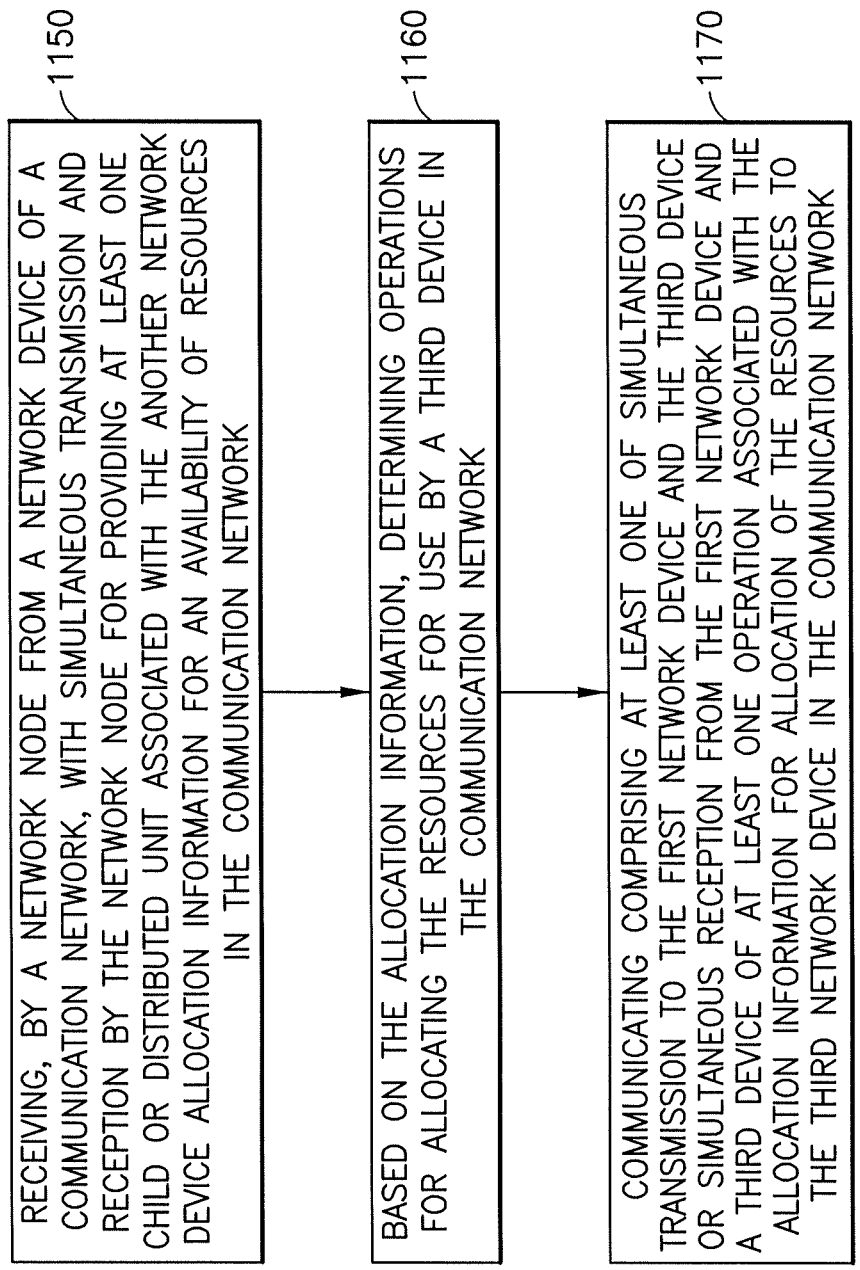

FIG. 11B shows a method in accordance with example embodiments of the invention which may be performed by an apparatus such as the network node or an NN 110 as in FIG. 10 or an IAB device of a communication network. As shown in step 1150 of FIG. 11B there is receiving, by a second network device from a first network device of a communication network, allocation information for an availability of resources in the communication network; as shown in step 1160 of FIG. 11B there is, based on the allocation information, determining operations for allocating the resources for use by a third device in the in the communication network. Then as shown in step 1170 of FIG. 11B there is communicating comprising at least one of simultaneous transmission to the first network device and the third device or simultaneous reception from the first network device and a third device of at least one operation associated with the allocation information for allocation of the resources to the third device in the communication network.

In accordance with example embodiments as described in the paragraph above, wherein the allocation information comprises information of at least one of spatial division multiplexing allocation information or frequency division multiplexing information for the allocation.

In accordance with example embodiments as described in the paragraphs above, wherein the allocation information comprises at least one of an availabilityindication indicating the resources are available or a PartialAvailabilityIndication indicating that the resources are only partially available.

In accordance with example embodiments as described in the paragraphs above, wherein the allocation information comprises at least one of frequency division multiplexing information or spatial division multiplexing information.

In accordance with example embodiments as described in the paragraphs above, wherein based on the allocation information comprising a PartialAvailabilityIndication and frequency division multiplexing information, the operations comprise marking resource blocks as partially available with a frequency division multiplexing restriction.

In accordance with example embodiments as described in the paragraphs above wherein the operations comprise marking resource blocks that are to be avoided for the allocation.

In accordance with example embodiments as described in the paragraphs above, wherein based on the allocation information comprising an AvailabilityIndication and spatial division multiplexing information.

In accordance with example embodiments as described in the paragraphs above, wherein the operations comprise scheduling the resource allocation subject to an existing beam constraint.

In accordance with example embodiments as described in the paragraphs above, wherein the AvailabilityIndication include parameters related to at least one of mean delay parameters, delay spread parameters, or doppler parameters.

In accordance with example embodiments as described in the paragraphs above, wherein the allocation information comprises an indication of at least one of Transmission Configuration Indicator states that have the same delay spread or Transmission Configuration Indicator states that are unavailable.

In accordance with example embodiments as described in the paragraphs above, wherein the allocation information comprises an indication of at least one set of bandwidth configurations of reserved physical resource blocks for the allocation.

In accordance with example embodiments as described in the paragraphs above, wherein the allocation information comprises an indication of which distributed unit of a plurality of distributed units is to be configured via a transmission to the at least one child.

In accordance with example embodiments as described in the paragraphs above, wherein the allocation information comprises an indication of whether the resources for the distributed unit are available for at least one of an uplink, reception, a downlink, transmission by the at least one child.

In accordance with example embodiments as described in the paragraphs above, wherein communicating the allocation information is using a physical downlink control channel.

A non-transitory computer-readable medium (Memory(ies) 155 as in FIG. 10) storing program code (Computer Program Code 153 and/or R Module 150-2 as in FIG. 10), the program code executed by at least one processor (Processor(s) 152 and/or R Module 150-1 as in FIG. 10) to perform the operations as at least described in the paragraphs above.

In accordance with an example embodiment of the invention as described above there is an apparatus comprising: means for receiving (one or more transceivers 160; Memory(ies) 155; Computer Program Code 153 and/or R Module 150-2; and Processor(s) 152 and/or R Module 150-1 as in FIG. 10), by a second network device (NN 170 as in FIG. 10) from a first network device (ND 110 of FIG. 10) of a communication network (Network 100 as in FIG. 10), allocation information for an availability of resources in the communication network; as shown in step 1160 of FIG. 11B there is, based on the allocation information, determining (one or more transceivers 160; Memory(ies) 155; Computer Program Code 153 and/or R Module 150-2; and Processor(s) 152 and/or R Module 150-1 as in FIG. 10) operations for allocating (one or more transceivers 160; Memory(ies) 155; Computer Program Code 153 and/or R Module 150-2; and Processor(s) 152 and/or R Module 150-1 as in FIG. 10) the resources for use by a third device in the in the communication network. Then as shown in step 1170 of FIG. 11B there is communicating (one or more transceivers 160; Memory(ies) 155; Computer Program Code 153 and/or R Module 150-2; and Processor(s) 152 and/or R Module 150-1 as in FIG. 10) comprising at least one of simultaneous transmission to the first network device and the third device or simultaneous reception from the first network device and a third device of at least one operation associated with the allocation information for allocation of the resources to the third device in the communication network.

In the example aspect of the invention according to the paragraph above, wherein at least the means for receiving and determining comprises a non-transitory computer readable medium [Memory(ies) 155 as in FIG. 10] encoded with a computer program [Computer Program Code 153 and/or R Module 150-2 as in FIG. 10] executable by at least one processor [Processor(s) 152 and/or R Module 150-1 as in FIG. 10].

Further, in accordance with example embodiments of the invention there is circuitry for performing operations in accordance with example embodiments of the invention as disclosed herein. This circuitry can include any type of circuitry including content coding circuitry, content decoding circuitry, processing circuitry, image generation circuitry, data analysis circuitry, etc.). Further, this circuitry can include discrete circuitry, application-specific integrated circuitry (ASIC), and/or field-programmable gate array circuitry (FPGA), etc. as well as a processor specifically configured by software to perform the respective function, or dual-core processors with software and corresponding digital signal processors, etc.). Additionally, there are provided necessary inputs to and outputs from the circuitry, the function performed by the circuitry and the interconnection (perhaps via the inputs and outputs) of the circuitry with other components that may include other circuitry in order to perform example embodiments of the invention as described herein.

In accordance with example embodiments of the invention as disclosed in this application this application, the "circuitry" provided can include at least one or more or all of the following:
  (a) hardware-only circuit implementations (such as implementations in only analog and/or digital circuitry);
  (b) combinations of hardware circuits and software, such as (as applicable):
    (i) a combination of analog and/or digital hardware circuit(s) with software/firmware; and
    (ii) any portions of hardware processor(s) with software (including digital signal processor(s)), software, and memory(ies) that work together to cause an apparatus, such as a mobile phone or server, to perform various functions, such as functions or operations in accordance with example embodiments of the invention as disclosed herein); and
  (c) hardware circuit(s) and or processor(s), such as a microprocessor(s) or a portion of a microprocessor(s), that requires software (e.g., firmware) for operation, but the software may not be present when it is not needed for operation."

In accordance with example embodiments of the invention, there is adequate circuitry for performing at least novel operations as disclosed in this application, this 'circuitry' as may be used herein refers to at least the following:
(a) hardware-only circuit implementations (such as implementations in only analog and/or digital circuitry); and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" as may be used herein is to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A method, comprising:
   determining, by a first network device in a communication network, allocation information for an availability of resources in the communication network; and
   sending, by the network device, to a second network device the allocation information for use in at least one of simultaneous transmission by the second network device to the first network device and a third device or simultaneous reception by the second network device from the first network device and a third device of at least one operation associated with the allocation information for allocation of the resources to the third device in the-communication network,
   wherein the allocation information comprises at least one of an availability indicator indicating the resources are available or a PartialAvailabilityIndication indicating that the resources are only partially available, and
   wherein based on the allocation information comprising the PartialAvailabilityIndication and frequency division multiplexing information, the operations comprise marking resource blocks as partially available with a frequency division multiplexing restriction.

2. The method of claim 1, wherein the allocation information comprises information of at least one of spatial division multiplexing allocation information for the allocation.

3. The method of claim 2, wherein the allocation information comprises an indication of resource blocks that should be avoided for the allocation.

4. The method of claim 2, wherein the allocation information comprises an indication of frequency reservations for the allocation configured at least one of persistently or semi-persistently.

5. The method of claim 2, wherein the allocation information comprises an indication of a set of frequency resources based on at least one of an initial sub-band and a number of sets of adjacent sub-bands for the allocation.

6. The method of claim 5, wherein the information is using a bitmap.

7. The method of claim 2, wherein the allocation information comprises an indication of at least one set of bandwidth configurations of reserved physical resource blocks for the allocation.

8. The method of claim 2, wherein the allocation information comprises spatial division multiplexing allocation information.

9. The method of claim 1, wherein the allocation information comprises an indication of which distributed unit of a plurality of distributed units is to be configured via a transmission to at least one child.

10. The method of claim 9, wherein the allocation information comprises an indication of whether the resources for the distributed unit are available for at least one of an uplink reception from or, a downlink transmission to the at least one child.

11. The method of claim 1, wherein sending the allocation information is using at least one of a physical downlink control channel and a backhaul.

12. An apparatus comprising:
    at least one processor; and
    at least one memory including computer program code, where the at least one memory and the computer program code are configured, with the at least one processor, to cause the apparatus to at least:
    determine, by a network device in a communication network, allocation information for an availability of resources in the communication network; and
    send, by the network device, to a second network device the allocation information for use in at least one of simultaneous transmission by the second network device to the first network device and a third device or simultaneous reception by the second network device from the first network device and a third device of at least one operation associated with the allocation information for allocation of the resources to the third device in the communication network,
    wherein the allocation information comprises at least one of an availability indicator indicating the resources are available or a PartialAvailabilityIndication indicating that the resources are only partially available, and
    wherein based on the allocation information comprising the PartialAvailabilityIndication and frequency division multiplexing information, the at least one operation comprise marking resource blocks as partially available with a frequency division multiplexing restriction.

13. The apparatus of claim 12, wherein the allocation information comprises information of at least one of spatial division multiplexing allocation information for the allocation.

14. The apparatus of claim 12, wherein the allocation information comprises an indication of resource blocks that should be avoided for the allocation.

15. The apparatus of claim 12, wherein the allocation information comprises an indication of frequency reservations for the allocation configured at least one of persistently or semi-persistently.

16. The apparatus of claim 12, wherein the allocation information comprises an indication of a set of frequency resources based on at least one of an initial sub-band and a number of sets of adjacent sub-bands for the allocation.

17. The apparatus of claim 16, wherein the information is using a bitmap.

18. The apparatus of claim 12, wherein the allocation information comprises an indication of at least one set of bandwidth configurations of reserved physical resource blocks for the allocation.

19. The apparatus of claim 12, wherein the allocation information comprises an indication of which distributed unit of a plurality of distributed units is to be configured via a transmission to at least one child.

20. The apparatus of claim 19, wherein the allocation information comprises an indication of whether the resources for the distributed unit are available for at least one of an uplink reception from or, a downlink transmission to the at least one child.

21. The apparatus of claim 12, wherein the allocation information comprises spatial division multiplexing allocation information.

22. The apparatus of claim 12, wherein sending the allocation information is using at least one of a physical downlink control channel and a backhaul.

23. A method, comprising:
receiving, by a second network device from a first network device of a communication network, allocation information for an availability of resources in the communication network;
based on the allocation information, determining operations for allocating the resources for use by a third device in the communication network; and
communicating comprising at least one of simultaneous transmission to the first network device and the third device or simultaneous reception from the first network device and a third device of at least one operation associated with the allocation information for allocation of the resources to the third device in the communication network,
wherein the allocation information comprises at least one of an availability indicator indicating the resources are available or a PartialAvailabilityIndication indicating that the resources are only partially available, and
wherein based on the allocation information comprising the PartialAvailabilityIndication and frequency division multiplexing information, the operations comprise marking resource blocks as partially available with a frequency division multiplexing restriction.

24. The method of claim 23, wherein the allocation information comprises information of at least one of spatial division multiplexing allocation information for the allocation.

25. The method of claim 23, wherein the allocation information comprises at least one of frequency division multiplexing information or spatial division multiplexing information.

26. The method of claim 23, wherein the operations comprise marking resource blocks that are to be avoided for the allocation.

27. The method of claim 23, wherein based on the allocation information comprising an AvailabilityIndication and spatial division multiplexing information.

28. The method of claim 27, wherein the operations comprise scheduling the resource allocation subject to an existing beam constraint.

29. The method of claim 28, wherein the AvailabilityIndication include parameters related to at least one of mean delay parameters, delay spread parameters, or doppler parameters.

30. The method of claim 23, wherein the allocation information comprises an indication of at least one of Transmission Configuration Indicator states that have the same delay spread or Transmission Configuration Indicator states that are unavailable.

31. The method of claim 23, wherein the allocation information comprises an indication of at least one set of bandwidth configurations of reserved physical resource blocks for the allocation.

32. The method of claim 23, wherein the allocation information comprises an indication of which distributed unit of a plurality of distributed units is to be configured via a transmission to at least one child.

33. The method of claim 32, wherein the allocation information comprises an indication of whether the resources for the distributed unit are available for at least one of an uplink, reception, a downlink, transmission by the at least one child.

34. The method of claim 23, wherein sending the allocation information is using a physical downlink control channel.

35. An apparatus comprising:
at least one processor; and
at least one memory including computer program code, where the at least one memory and the computer program code are configured, with the at least one processor, to cause the apparatus to at least:
receive, by a second network device from a first network device of a communication network, allocation information for an availability of resources in the communication network;
based on the allocation information, determining operations for allocating the resources for use by a third device in the communication network; and
communicate comprising at least one of simultaneous transmission to the first network device and the third device or simultaneous reception from the first network device and a third device of at least one operation associated with the allocation information for allocation of the resources to the third device in the communication network,
wherein the allocation information comprises at least one of an availability indicator indicating the resources are available or a PartialAvailabilityIndication indicating that the resources are only partially available, and
wherein based on the allocation information comprising the PartialAvailabilityIndication and frequency division multiplexing information, the operations comprise marking resource blocks as partially available with a frequency division multiplexing restriction.

36. The apparatus of claim 35, wherein the allocation information comprises information of at least one of spatial division multiplexing allocation information for the allocation.

37. The apparatus of claim 36, wherein the allocation information comprises spatial division multiplexing information.

38. The apparatus of claim 36, wherein the operations comprise marking resource blocks that are to be avoided for the allocation.

39. The apparatus of claim 36, wherein based on the allocation information comprising an AvailabilityIndication and spatial division multiplexing information.

40. The apparatus of claim 39, wherein the operations comprise scheduling the resource allocation subject to an existing beam constraint.

41. The apparatus of claim 40, wherein the Availability-Indication include parameters related to at least one of mean delay parameters, delay spread parameters, or doppler parameters.

42. The apparatus of claim 35, wherein the allocation information comprises an indication of at least one of Transmission Configuration Indicator states that have the same delay spread or Transmission Configuration Indicator states that are unavailable.

43. The apparatus of claim 35, wherein the allocation information comprises an indication of at least one set of bandwidth configurations of reserved physical resource blocks for the allocation.

44. The apparatus of claim 35, wherein the allocation information comprises an indication of which distributed unit of a plurality of distributed units is to be configured via a transmission to at least one child.

45. The apparatus of claim 44, wherein the allocation information comprises an indication of whether the resources for the distributed unit are available for at least one of an uplink, reception, a downlink, transmission by the at least one child.

46. The apparatus of claim 35, wherein communicating the allocation information is using a physical downlink control channel.

* * * * *